United States Patent [19]

Zollinger

[11] 4,095,082

[45] June 13, 1978

[54] APPARATUS FOR WELDING ELECTRICAL CONTACTS

[75] Inventor: Hans Rudolf Zollinger, Geroldswil, Switzerland

[73] Assignee: H. A. Schlatter AG, Schlieren, Switzerland

[21] Appl. No.: 695,816

[22] Filed: Jun. 14, 1976

[30] Foreign Application Priority Data

Jun. 27, 1975 Switzerland ........................ 8363/75

[51] Int. Cl.[2] .............................................. B23K 11/00

[52] U.S. Cl. .................................... 219/78.15; 219/79

[58] Field of Search .................... 219/78, 103, 84, 119, 219/107, 79; 228/54

[56] References Cited

U.S. PATENT DOCUMENTS

| | | | |
|---|---|---|---|
| 3,037,108 | 5/1962 | Poillevey | 219/107 X |
| 3,115,570 | 12/1963 | Denzler | 219/78 |
| 3,581,047 | 5/1977 | Mitchell | 219/119 |
| 3,694,614 | 9/1972 | Bihlel | 219/103 |
| 3,812,582 | 5/1974 | Zollinger | 228/5.1 X |

*Primary Examiner*—Elliot A. Goldberg
*Attorney, Agent, or Firm*—Brady, O'Boyle & Gates

[57] ABSTRACT

Band shaped contact material is advanced along an approximately horizontal contact material guide past a displaceable knife and counter-holder which cooperates with a stationary counter-knife to a directly adjacent approximtely horizontal contact piece guide in alignment with the contact material guide for receiving successive contact pieces cut-off by the knives which are ejected from the contact piece guide by horizontal advance of the contact material onto a horizontal surface of a vertically movable electrode of a resistance welding device which raises the contact piece into compressive contact against a contact carrier held on the surface of a stationary upper electrode of the welding device and then the two pieces are welded together. Interconnecting apparatus is operative to simultaneously draw back the contact material after the ejection step into the position necessary for the knives to cut off the next contact piece as the previous contact piece is welded to a contact carrier.

7 Claims, 4 Drawing Figures

APPARATUS FOR WELDING ELECTRICAL CONTACTS

Figure 1:
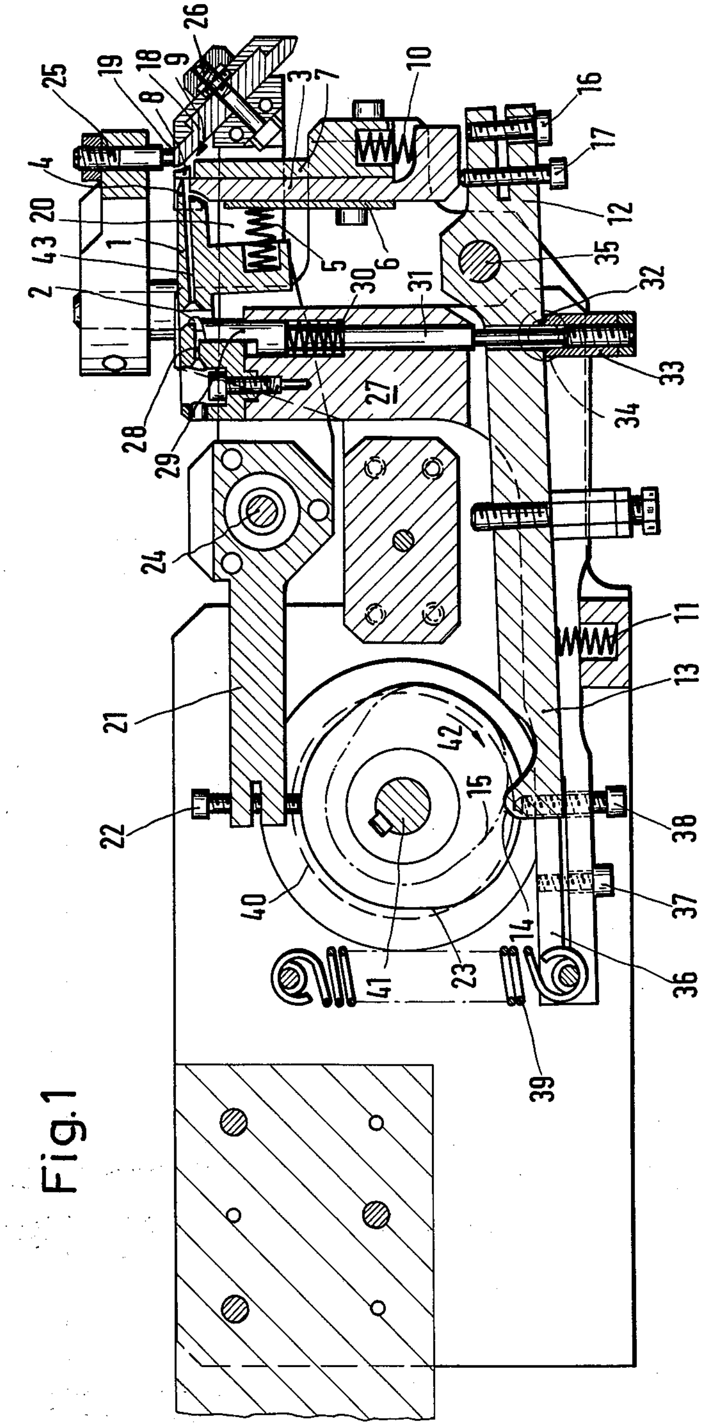

This invention relates to a method of producing electrical contacts in which a contact piece is cut off from a wire-shaped or band-shaped contact material, is ejected from the cutting device by advance of the contact material, is welded by resistance welding to a contact carrier consisting of sheet metal or wire and simultaneously the contact material is drawn back into the position necessary for the cutting off of the next contact piece.

The invention also relates to apparatus for carrying out the method having a contact material guide, a device, linking to the latter, for cutting-off the contact pieces, comprising a displaceable knife with a back-stop, a stationary complementary knife, a directly-subsequent guide, in alignment with the contact material guide, for the successively cut-off contact pieces, a resistance welding device with a stationary and a vertically-movable electrode which can be acted upon with the necessary compressive welding force, and with a device which pushes the contact material forwards, after the cutting-off of a contact piece, for ejecting the same from the contact piece and thereafter draws the same back into the position necessary for the cutting-off of the next contact piece.

It is known in a prior proposal to push each cut-off contact piece through a contact piece guide, at an acute angle to the horizontal, obliquely downwards onto a contact carrier. For this, the lower part of the contact piece guide is a wedge at the obtuse end of which is formed a stationary counter-knife which is complementary to displaceable knife which cuts from above downwards. On account of the necessary strength of the counter-knife and on account of the necessary cutting stroke, the wedge has to have a specific minimum thickness at the obtuse end. Furthermore, the wedge angle has to be as small as possible so that the contact piece ejected from the contact piece guide will slide without lateral direction change onto the contact carrier, in order to pass onto the desired place on the latter and not to deviate laterally. From the necessary thickness of the obtuse wedge end and the necessarily small wedge angle there results a comparatively long contact piece guide, and the advance path over which the contact material pushes the contact piece through the contact piece guide is correspondingly long. The contact material is not guided along an advance movement of jaws which push the contact material forwards. This contact material can therefore deviate upon being pushed forwards, more especially if slight residues of grease or the like on the contact material lead to increased friction in the contact piece guide. This can cause interruptions in the feed.

The object of the present invention is to provide an arrangement having a shorter contact piece guide and a correspondingly shorter advance stage, whereby the above-discussed difficulties are minimised.

In the case of the method in accordance with the invention, this object is achieved in that the contact piece which has been cut off is pushed, by horizontal advance of the contact material, onto a horizontal surface of a welding electrode, this electrode, with the contact piece lying thereon, is raised and thereby pressed against a contact carrier arranged under a counter-electrode and is then welded to the latter.

In the case of the apparatus, in accordance with the invention, for carrying out this method, the contact material guide and the contact piece guide extend at least approximately horizontally, the movable electrode having a horizontal upper surface which, in the position of rest of the movable electrode, links directly to the outlet of the contact piece guide and is in alignment therewith, and in that arranged above this electrode is the stationary counter-electrode and a holder for holding a contact carrier against the underside of the counter-electrode.

A considerable advantage arising from the apparatus consists in that the contact piece guide can be as short as may be desired. For example, the contact piece guide can be ten times shorter than the known contact piece guide having a wedge-shaped lower part.

An advantage which additionally arises from the method and apparatus of the invention consists in that the contact pieces maintain their directions of movement unchanged when they are ejected from the contact pieve guide.

Figure 2:
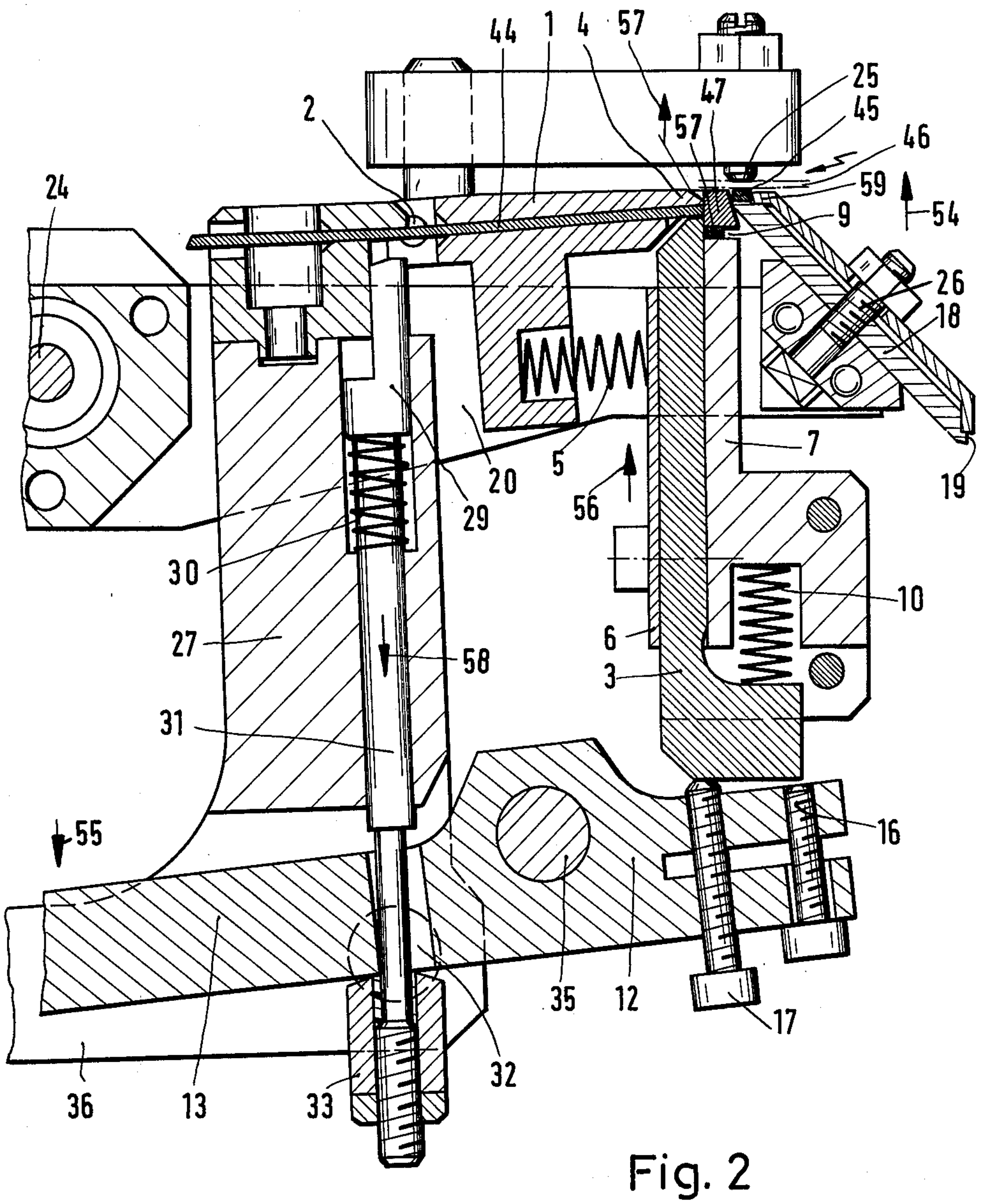
Figure 3:
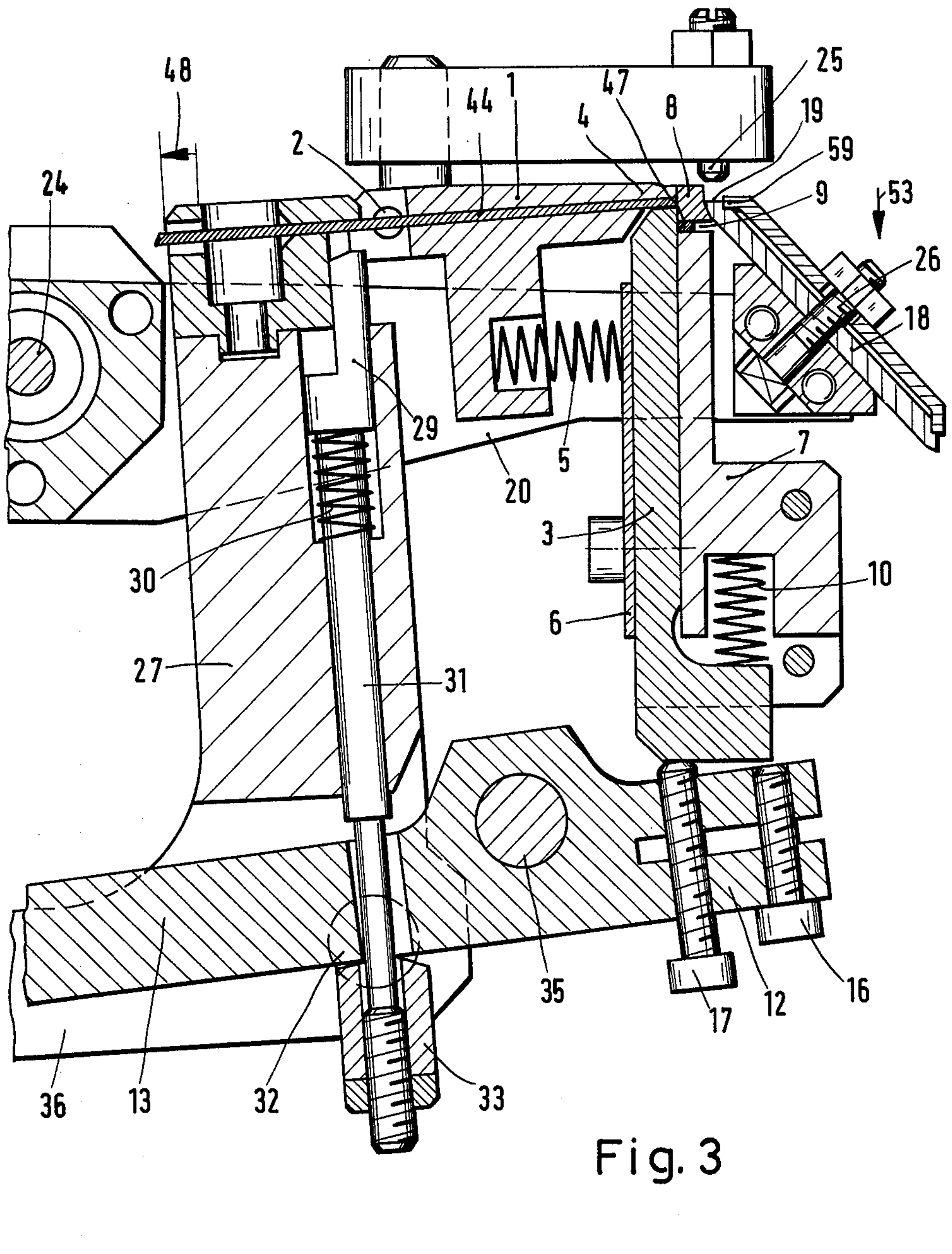
Figure 4:
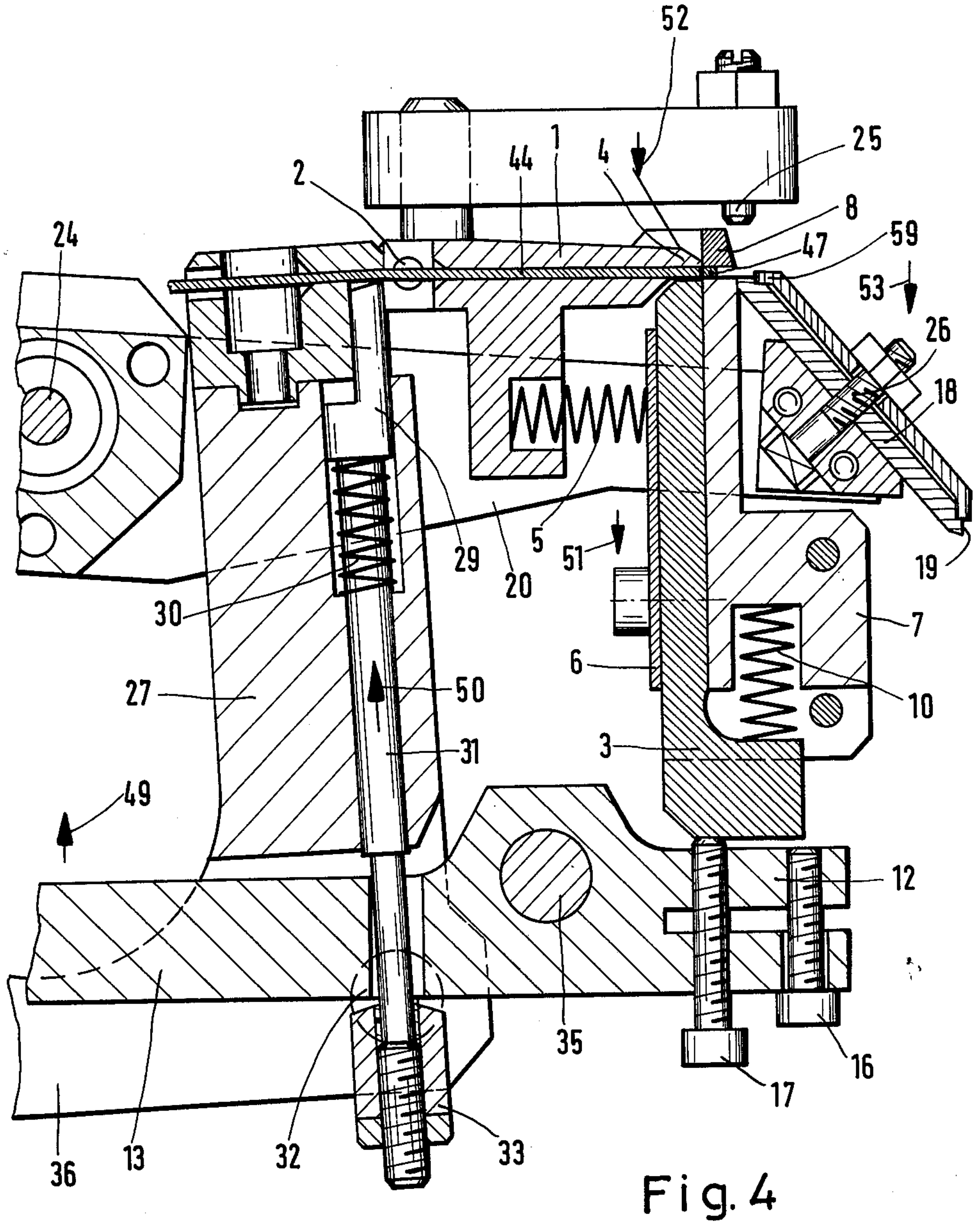

The invention will be described further, by way of example, with reference to the accompanying drawings, in which FIG. 1 is a longitudinal section through an embodiment of the apparatus for producing electrical contacts in accordance with the invention, the moving parts thereof being shown in their positions in which the welding process takes place;

FIG. 2 is a detailed view of the right-hand part of FIG. 1 to a larger scale, and showing contact material in position, movements of various parts which have preceded in position shown being represented by arrows; and FIGS. 3 and 4 are views similar to FIG. 2 but showing the apparatus in further phases of a work cycle.

The apparatus shown has a contact material guide 1 with a guide channel 43 (FIG. 1) for wire-like or band-shaped contact material 44 (FIGS. 2 to 4). This guide 1 is mounted so as to be swingable about a stationary pivot pin 2 which is shown only partially. In the position shown in FIG. 2 and in the position shown in FIG. 3, a displaceably-mounted knife 3 pushes the end of the contact material 44 against the upper end, designed as a counter-holder 4 and shown to the right in the drawing, of the contact material guide 1 and holds this against the force of a compression spring 5 in a position swung somewhat upwardly. The knife 3 is guided between two stationary parts 6 and 7. The spring 5 is supported on the part 6. Formed between the upper end of the part 7 and a counter-knife 8 is a contact piece guide 9 whose guide channel is in alignment with the channel of the contact material guide 1 when this assumes its position of rest (FIG. 4). In this connection, both guide channels extend horizontally. The knife 3 is driven, contrary to the force of two stationarily-supported compression springs 10 and 11, by one arm 12 of a two-armed lever, the other arm 13 of which is provided with a lobe 14 which runs on a cam disc 15. The lever 12, 13 is swingable about a stationary pivot pin 35. An adjusting screw 17, lockable by means of a pinch screw 16, makes an accurate adjustment of the knife 3 possible.

At the outlet side of the contact piece guide 9 is a disc-shaped electrode 18 having a conical edge 19 and carried on one arm 20 of a two-armed lever, the other arm 21 of which is provided with an adjusting screw 22 (which is lockable in a manner which is not shown) which runs on a cam disc 23. The lever 20, 21 is swingable about a stationary pivot pin 24. The conical edge 19 of the electrode 18 is privided with several grooves (not shown) extending along generatrices. In the welding position, shown in FIGS. 1 and 2, of the electrode 18, a groove is under stationary upper counter-electrode 25. This groove receives a respective contact piece 45, which has been cut off in such a way (FIG. 2) that it same protrudes sufficiently beyond the conical edge 19 to be welded to a contact carrier 46 which is indicated in dot-dash lines in FIG. 2 and which is held in a holder (not shown) at the underside of the counter-electrode 25. A stop 59 prevents the contact piece 45 which has been cut off from slipping forwards (i.e. to the right in the drawing).

In the position of rest, shown in FIG. 4, of the electrode 18, this groove is in alignment with the contact piece guide 9. By rotation of the electrode 18 about its axis 26, after one groove has been worn away another can be used. For this purpose, the electrode 18 is lockable on the arm 20. A spring (not shown) serves for exerting compressive welding force and endeavours to force the adjusting screw 22 against the cam disc 23. The adjusting screw 22 is so adjusted that it slides on the cam disc 23 only upon the movement of the electrode 18 from the welding position shown in FIGS. 1 and 2 into the position of rest shown in FIG. 2 and conversely as well as in the position of rest of the electrode 18, but in the welding position has a small spacing from the cam disc 23 so that the spring exerts the compressive welding force.

For the advance of the contact material 44, formed at the end of one arm 27 (which is a feed arm) of an angle lever is a contact material passage 28, into which projects a tappet 29 for clamping the contact material 44. The tappet 29 is loaded by a compression spring 30 and can be relieved by a pull rod 31 which passes in freely-movable manner through a bore 32 of the arm 13 of the lever 12, 13 actuating the knife 3 and is supported, on the underside thereof, by an adjusting nut 33 which is fixed with a locknut. The axis of the bore 32 (and thus also the axis of the pull rod 31) intersects the axis of the pivot pin about which the angle lever with the feed arm 27 is swingable, and is spaced from the axis of the pivot pin 35 about which the lever 12, 13 is swingable. In this way the result is achieved that the relieving, effected by the pull rod 31, of the tappet 29 is independent of the position of the angle lever, but is dependent on the position of the lever 12, 13. Moreover this relieving is adjustable by means of the adjusting nut 33. The other angle lever arm 36 arries an adjusting screw 38 which is lockable with pinch screw 37 and is forced, under the action of a draw spring 39, against a cam disc 40.

The cam disc 15, 23 and 40 are mounted on a common shaft 41 and are driven in the direction indicated by arrow 42.

Before the positions, shown in FIGS. 1 and 2, of the moving parts of the apparatus were reached, the contact material 44 had (as is explained in detail later on) been advanced to such an extent, through the guide channel 43, that a piece 47, which is as long as one contact piece to be cut off and to be welded on, projected into the contact piece guide 9. The displaceable knife 3 moved upwards into the position shown in FIGS. 1 and 2, cut this piece 47 off in so doing, and the end of the contact material 44 is now clamped under the action of the spring 5 between the knife 3 and the end, designed as the counter-holder 4, of the contact material guide 1. The electrode 18 presses a contact piece 45, previously brought into its topmost groove, against the contact carrier 46 lying against the underside of the upper counter-electrode 25 (FIG. 2). The tappet 29 is relieved.

When the cam discs 15, 23 and 40 rotate in the direction of the arrow 42 out of the position shown in FIG. 1, the electrode 18 initially stands still and a welding current impulse is initiated by means which are not illustrated (FIG. 2). The feed arm 27 swings to the left (arrow 48 in FIG. 3), during which the contact material 44 is not entrained, because its end is clamped between the knife 3 and the counter-holder 4 and the tappet 29 is relieved.

The arm 13 swings upwards (arrow 49 in FIG. 4), whereby the pull rod 31 is released by the spring 30 (arrow 50 in FIG. 4), so that the contact material 44 is clamped by the tappet 29 in the passage 28. At the same time the knife 3 goes downwards (arrow 51 in FIG. 4), the spring 5 forces the contact material guide 1 into its horizontal position (arrow 52 in FIG. 4) against a stop (not shown) and immediately subsequent thereto the end of the contact material 44 between the knife 3 and the counter-holder 4 is free (FIG. 4). The electrode 18 is lowered after conclusion of the welding procedure (arrow 53 in FIGS. 3 and 4). When the electrode 18 has reached its position of rest (FIG. 4) in which the contact material guide 1 is in alignment with the contact piece guide 9, the feed arm 27 swings forwards (to the right in the drawing, contrary to the direction of the arrow 48 in FIG. 3) and pushes or knocks the contact material 44, restrained in its passage 28 by the tappet 29, as far as the end of the contact piece guide 9. In this way, the contact piece 47, previously cut off and present in the contact piece guide, 9, is pushed onto the groove, in alignment with the contact piece guide 9, of the electrode 18.

Subsequently the electrode 18 is raised upwards into the work position shown in FIGS. 1 and 2 (arrow 54 in FIG. 2). The feed arm 27 draws the contact material 44 back right to the position (FIG. 4) necessary for the cutting-off of the next contact piece 47.

The arm 13 now swings downwards (arrow 55 in FIG. 2), the knife 3 moves upwards (arrow 56 in FIG. 2), the contact material guide 1 swings upwards (arrow 57 in FIG. 2) and the pull rod 31 tensions the spring 30 (arrow 58 in FIG. 2), so that the tappet 29 is released. Thus the initial state (FIGS. 1 and 2) of the described work cycle is reached once more and the described procedures are repeated, the contact piece 47 cut off upon the raising of the knife 3 being pushed onto the groove of the electrode 18 and being welded onto the contact carrier 46 which is progressed in the meantime by one contact piece spacing.

Advantageously the lever arm 36 is forked at its end, and each of the limbs formed thereby carries a respective adjusting screw which is associated with a respective one of two cam discs. By means of these two adjusting screws, the withdrawal movement can be adapted to different contact piece lengths, the one adjusting screw running on the one cam disc and the other adjusting screw running on the other cam disc.

What we claim is:

1. An apparatus for the production of electrical contacts on contact carriers, comprising:

a cutting device adapted to cut a contact piece from a strip of wire or ribbon-like contact material;

a first guide means positioned for guiding the strip of contact material to said cutting device;

an electrical resistance welding device spaced from said cutting device for welding a cut contact piece to a contact carrier;

a second guide means arranged between said cutting and said welding device for guiding contact material from said cutting to said welding device;

said first and second guide means connected in alignment;

said welding device having a first stationary electrode and a second electrode liftably arranged beneath said first electrode;

a holder for holding the contact carrier at the underside of said first electrode;

said second electrode having a groove for receiving a lower part of the cut contact piece and being liftable from a rest position, in which said groove is connected in alignment to said second guide means, to a welding position, in which it is pressed towards said first electrode, gripping means adapted to grip and move the remaining strip of contact material; and driving means for actuating said cutting device, said gripping means and said second electrode in such a manner that, in sequence, said cutting device cuts a contact piece from the strip of contact material, said gripping means advances the remaining strip of contact material into said second guide means to push the cut contact piece from said cutting device through and out of said second guide means in said groove of said second electrode, being in its rest position, and subsequently withdraws the remaining strip of contact material from said second guide means by a distance which is smaller by the length of the cut contact piece than the distance by which the cut contact piece is advanced to said groove of said second electrode by the strip of contact material, and upon the beginning of said withdrawing of the remaining strip of contact material said second electrode is lifted from said rest position to said welding position and thereafter descented to said rest position.

2. Apparatus as claimed in claim 1, wherein said second electrode is a roller or disc electrode which is rotatably mounted on an axis and lockable in its rotary position and which has a plurality of grooves extending along surface lines, each of said grooves being connectable by rotation of the electrode in its rest position in alignment to said second guide means, in order to receive a lower part of a cut contact piece.

3. Apparatus as claimed in claim 2, wherein said roller or disc electrode has a conical curved surface which is provided with said grooves.

4. Apparatus as claimed in claim 1, wherein said cutting device comprises a displaceable blade, a counterabutment connected to cooperate with said desplaceable blade and a stationary blade, said gripping means includes a disengageable spring-loaded clamping member for the contact material and in sequence, at the end of the cutting stroke, with the remaining strip of contact material stationary and clamped at its end between said displaceable blade and said counter-abutment said clamping member is disengaged and performs a rearward stroke which corresponds to the length of the contact piece guide, and then, with the displaceable blade drawn back, said clamping member clamps the remaining strip of contact material and carries out a forward stroke which advances the remaining strip of contact material and subsequently a rearward stroke which withdraws the remaining strip of contact material and which is shorter by the contact length than the forward stroke.

5. Apparatus as claimed in claim 4, wherein said driving means includes a member which disengages said clamping member and drives said displaceable blade.

6. Apparatus as claimed in claim 4, wherein said driving means include an advance and withdraw arm, bearing at one end said spring-loaded clamping member, and an arm driving said displaceable blade and upon driving of the blade actuating a member which tensions the spring, loading said clamping member, and thereby disengages the clamping member.

7. Apparatus as claimed in claim 6, wherein said driving means include an arm moving said second electrode, said advance and withdraw arm is one arm of an angle lever, said arm, driving said displaceable blade, and said arm moving said second electrode being one arm each of a two-armed elongate lever, and in that said driving means further includes three cam discs mounted on a common shaft and driving the three levers.

* * * * *